May 24, 1966  F. M. KENTES  3,252,377
V-SHAPED VEHICLE MIRROR AND MOUNTING ASSEMBLY
Filed July 6, 1962
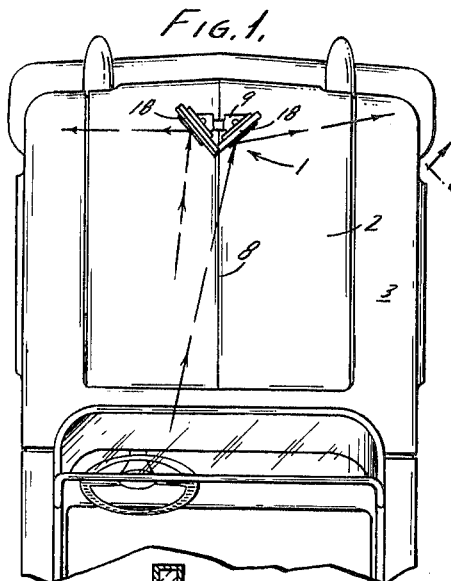
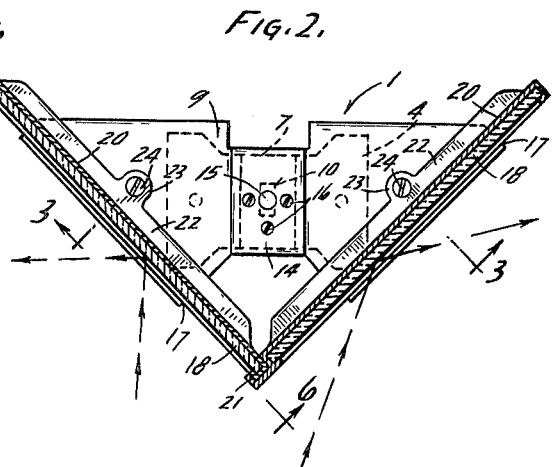
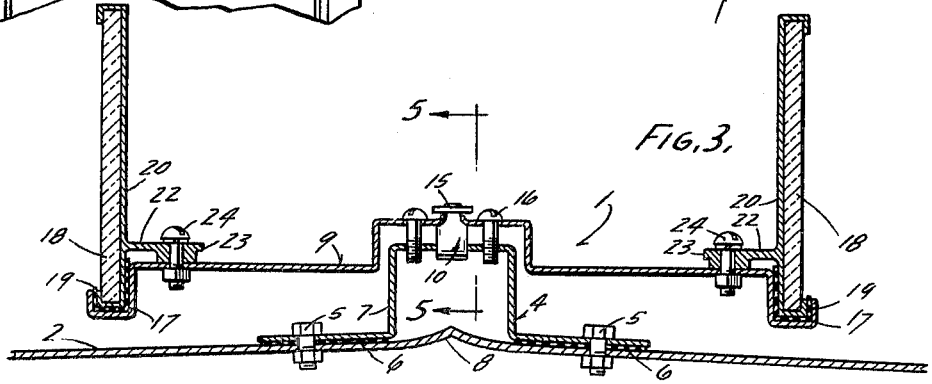
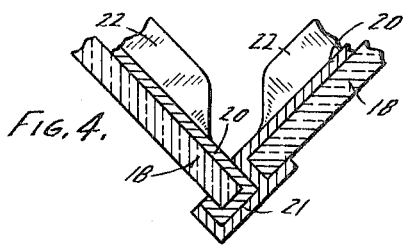
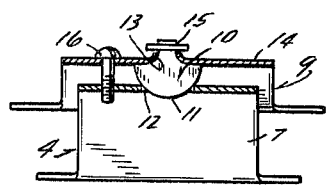
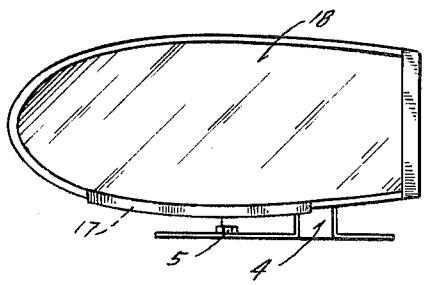
INVENTOR.
FRANCES M. KENTES
BY
ANDRUS & STARKE
Attorneys,

United States Patent Office 3,252,377
Patented May 24, 1966

3,252,377
V-SHAPED VEHICLE MIRROR AND MOUNTING ASSEMBLY
Frances M. Kentes, 1958 N. 28th St., Milwaukee, Wis. 53208
Filed July 6, 1962, Ser. No. 207,873
1 Claim. (Cl. 88—87)

This invention relates to a vehicle mirror assembly and more particularly to a mirror assembly mounted on the front of a motor vehicle in position so that the driver can see objects in advance to the right and left of the vehicle.

In many situations, it is desirable for a driver of a motor vehicle to see objects in advance to the right and left of the front of the vehicle. For example, as an automobile approaches an intersection, a view to the side may be blocked by a parked automobile, snow drifts or other obstructions so that the driver cannot fully see whether traffic is approaching. In the normal situation, the driver is forced to inch forwardly moving the front of the vehicle into the intersection in order to see whether traffic is approaching. This, of course, presents a serious traffic hazard.

The present invention is directed to a mirror assembly which includes a pair of mirrors or reflective surfaces which are mounted on the front of the hood of the automobile or other vehicle. The mirrors are mounted angularly in a manner to permit the driver an indirect view up and down the street as the vehicle approaches an intersection, moves out of a driveway or garage, or the like. More specifically the mirror assembly includes a base which is secured to the front portion of the hood of the automobile or other motor vehicle. A mounting bracket is secured to the base by means of a rocking support member. The rocking support member permits the mounting bracket to be pivoted in a fore-and-aft direction of the automobile but prevents sideways movement. A series of set screws firmly secure the mounting bracket in position to the base.

The mounting bracket includes a pair of grooves which are located angularly with respect to each other and each groove receives the bottom edge of a mirror. The mirrors are positioned in a V-shape with the apex of the V facing to the rear of the automobile. With this construction, the driver by looking into the mirrors can see both to the right and left of the front of the vehicle.

The mirror assembly of the invention is of simple construction and can be readily mounted on the hood or front of the vehicle without any alteration of reconstruction of the vehicle. Because of the tilting or rocking connection between the mirror mounting bracket and the base, the assembly can be mounted generally on most automobiles regardless of the slope or pitch of the forward portion of the hood. The specific mounting construction of the invention reduces vibration of the mirror and firmly holds the mirrors so that the driver at all times has a clear view to the side of the vehicle.

Other objects and advantages will appear in the course of the following description.

The drawings illustrate the best mode presently contemplated for carrying out the invention.

In the drawings:

FIG. 1 is a fragmentary plan view of an automobile embodying the mirror assembly of the invention;

FIG. 2 is a plan view of the mirror assembly;

FIG. 3 is a vertical section taken along line 3—3 of FIG. 2;

FIG. 4 is an enlarged horizontal section showing the connection of the mirrors together;

FIG. 5 is a view taken along line 5—5 of FIG. 3; and

FIG. 6 is a side elevation taken along line 6—6 of FIG. 2.

The drawings illustrate a mirror assembly 1 which is mounted on the hood 2 of an automobile 3 or other motor vehicle.

The mirror assembly 1 includes a base 4 which is secured by bolts 5 to the hood 2. A pair of gaskets 6 are disposed between the bracket and the hood and serve to protect the finish of the hood, as well as providing a resilient connection between the members.

The central portion of the base 4 is raised and has a generally channel-shaped cross section, as indicated by 7. The central section 7 is spaced above the longitudinal ridge 8 formed in the hood 2 and permits the base to be readily mounted on all automotive hoods, regardless of whether or not they include a central ridge, as shown by 8.

A mirror mounting bracket 9 is mounted on the central section 7 of base 4 by a rocking support member 10. As best shown in FIG. 5 the rocking support is provided with a curved or rounded lower edge 11 which rests within a slot or opening 12 formed in the upper surface of section 7. The upper portion of the support member 10 is provided with a reduced diameter and is located within the flanged opening 13 in the central channel-shaped section 14 of the mounting bracket 9. A head 15 is secured to the upper end of the support member 10 either by welding, or by means of a threaded connection, to thereby retain the support member 11 within the mounting bracket 9.

The rocking support member 10 permits the mounting bracket 9 to be tilted or pivoted in a fore-and-aft direction with respect to the automobile, but prevents lateral or a sideways movement of the mounting bracket with respect to the base 4.

The mounting bracket 9 can be firmly secured with respect to the base by a series of set screws 16 which are disposed within aligned openings in the central sections 14 and 7 of the bracket 9 and base 4, respectively. By threading the set screws 16 within the openings in the section 7, the sections 7 and 14 are drawn together to thereby prevent pivotal movement of the mounting bracket 9 with respect to the base 4.

The side edge portions of the bracket 9 are provided with grooves 17 and the lower edges of mirrors 18 are supported within the grooves 17. Gaskets 19 are located between the mirrors 18 and the grooves 17.

The mirrors 18 are arranged in a V-shape, as best shown in FIGS. 1 and 2, with the apex of the V pointing toward the rear of the automobile. As best shown in FIG. 6, each mirror 18 has a generally straight, vertical edge at the apex of the mirror assembly, and the outer portion of each mirror is generally curved or rounded. To provide an increased field of vision, the mirrors are convex, with a 2° convexity having been proved most satisfactory. It is contemplated that any type of reflected surface may be employed as the mirrors 18.

As shown in FIG. 1, the apex of the mirror assembly is in alignment with the ridge 8 of hood 2 and faces directly to the rear of the automobile. As the driver's seat is to the side of the longitudinal center line of the automobile, the mirror on the right side of the hood is positioned at a different angle with respect to the center line than the left-hand mirror so that the driver obtains a similar view to both the right and left of the automobile.

The peripheral edge or margin of each of the mirrors 18 is enclosed within a metal or plastic backing member 20 and one of the backing members 20 is provided with a vertically extending groove 21, which is located at the apex of the assembly and receives the vertical edge of the other mirror 18. The groove 21 serves to connect the mirrors 18 together at the apex and provide a more rigid assembly.

Each mirror 18 is provided with a generally horizontal flange 22 which is formed integrally with the backing member 20 and each flange 22 is connected to the bracket 9 by a bolt 24. The flanges 22 are provided with bosses 23 and bolts 24 extend through aligned openings in the bosses and bracket 9 to firmly secure the mirrors 18 to the bracket 9.

To mount the mirror assembly on the hood 2, the base 4 is initially connected to the hood by means of the bolts 5. The bracket 9 carrying the mirrors 18 is then mounted on the base 4 and pivoted or tilted by means of the rocking support 10 until the mirrors 18 are at the proper vertical angle. The set screws 16 are then threaded down into the section 7 to firmly secure the bracket 9 to the base 4.

As best shown in FIG. 1, mirrors 18 are positioned so that the driver can see laterally or to both sides of the automobile. This enables the driver to see beyond obstructions, such as parked cars or snow banks which may be located adjacent the road or intersection. The mirrors are firmly secured by the mounting brackets to the base so that the vibration of the mirrors is minimized. Moreover, the rocking support 10 enables the mirrors to be pivoted in a fore-and-aft direction of the automobile and to be properly adjusted with respect to the hood of the automobile.

Various modes of carrying out the invention are contemplated as being within the scope of the following claim particularly pointing out and distinctly claiming the subject matter which is regarded as the invention.

I claim:

A mirror assembly for a motor vehicle, comprising a base adapted to be secured to a hood of a motor vehicle and including an inverted generally U-shaped central section extending longitudinally of said hood and having an opening therein, a mounting bracket connected to said base, a pivotable support member secured to said mounting bracket and having a curved lower surface extending in a fore-and-aft direction with respect to the vehicle and disposed partially within said opening with said curved surface mounted for rocking movement on the edges of said central section bordering said opening whereby said mounting bracket can be pivoted in a fore-and-aft direction with respect to said vehicle, means for removably securing said mounting bracket to the central section of the base to prevent rocking movement of said bracket, said bracket having a pair of grooves along the side edges thereof, a pair of mirrors mounted on the bracket with each mirror having a substantially horizontal lower edge disposed within a groove in the bracket and each mirror having a substantially vertical edge with the vertical edges of said mirrors meeting at the centerline of said mirror assembly to provide a generally V-shaped arrangement of said mirrors, each of said mirrors including a reflective surface and a backing member, said backing member including a flange extending inwardly toward the centerline of said base and disposed generally parallel to said mounting bracket, and means for connecting each flange to the mounting bracket to firmly secure the mirrors to said mounting bracket.

References Cited by the Examiner

UNITED STATES PATENTS

| | | | |
|---|---|---|---|
| 557,575 | 4/1896 | Gibson et al. | 88—97 |
| 892,612 | 7/1908 | O'Neill. | |
| 1,920,490 | 8/1933 | Tracy. | |
| 2,100,938 | 11/1937 | Brandt | 88—98 |
| 2,739,509 | 3/1956 | Hertz | 88—86 |
| 2,783,683 | 3/1957 | Maurer | 88—86 |

FOREIGN PATENTS

| | | |
|---|---|---|
| 517,436 | 2/1953 | Belgium. |
| 643,618 | 5/1928 | France. |
| 781,145 | 2/1935 | France. |
| 1,073,620 | 3/1954 | France. |
| 1,108,325 | 10/1955 | France. |
| 1,197,428 | 6/1959 | France. |
| 312,802 | 6/1929 | Great Britain. |
| 484,895 | 9/1953 | Italy. |

JEWELL H. PEDERSEN, *Primary Examiner.*

FREDERICK M. STRADER, *Examiner.*

D. J. HOFFMAN, W. L. SIKES, *Assistant Examiners.*